United States Patent
Lee et al.

(10) Patent No.: US 6,964,007 B2
(45) Date of Patent: Nov. 8, 2005

(54) ASYMMETRIC ERROR CORRECTION APPARATUS AND METHOD, AND CLOCK RECOVERING APPARATUS FOR OPTICAL READING SYSTEM EMPLOYING THE SAME

(75) Inventors: Jung-Hyun Lee, Seoul (KR); Seok-Jun Ko, Suwon (KR); Pan-Soo Kim, Suwon (KR); Hyung-Jin Choi, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 459 days.

(21) Appl. No.: 10/215,201

(22) Filed: Aug. 9, 2002

(65) Prior Publication Data

US 2003/0066023 A1    Apr. 3, 2003

(30) Foreign Application Priority Data

Aug. 10, 2001  (KR) ............................... 2001-48227

(51) Int. Cl.⁷ ...................... G06F 11/00; H03M 13/03
(52) U.S. Cl. ...................................... 714/798; 714/789
(58) Field of Search .................. 714/746, 798–799, 714/775, 789, 752, 762; 375/343, 376, 357; 370/503; 369/44.32, 30.22, 47.35

(56) References Cited

U.S. PATENT DOCUMENTS 5,359,631 A  * 10/1994  Behrens et al. ............. 375/376

* cited by examiner

*Primary Examiner*—Shelly Chase
(74) *Attorney, Agent, or Firm*—Sughrue Mion, PLLC

(57) ABSTRACT

An asymmetric error correction apparatus and method, and clock recovering apparatus and data recovering apparatus for a system for reading data from an optical recording medium such as a CD or DVD that has a multi-level input signal and irregular characteristic of zero-crossing transition. The signal inputted from the optical recording medium is digitized, and a zero-crossing detector extracts four sequential samples and detects a zero-crossing point from the two intermediate samples. An asymmetric error detector judges an asymmetric state and asymmetric polarity of the digital signal from a sum of the two side samples among the four samples if the zero-crossing point is detected. A correction section accumulates the judged asymmetric polarities, judges an asymmetric error of the digital signal if the accumulated value exceeds a predetermined threshold, and corrects the asymmetric error of the read signal caused by an inaccurate pit length.

18 Claims, 14 Drawing Sheets

000# ASYMMETRIC ERROR CORRECTION APPARATUS AND METHOD, AND CLOCK RECOVERING APPARATUS FOR OPTICAL READING SYSTEM EMPLOYING THE SAME

BACKGROUND OF THE INVENTION

1. Field of the Invention

The present invention relates to an asymmetric error correction apparatus and method, and clock recovering apparatus and data recovering apparatus for an optical reading system employing the error correction apparatus. In particular, the present invention relates to an asymmetric error correction apparatus and method, and clock recovering apparatus and data recovering apparatus for an optical reading system employing the same that can correct distortion of a radio frequency (RF) signal caused by interference among data due to inaccurate pit and land lengths during data writing on an optical recording medium. The present application is based on Korean Application No. 2001-48227, filed Aug. 10, 2001, which is incorporated herein by reference.

2. Description of the Related Art

An optical recording system forms a pit corresponding to a signal to be recorded on an optical reading medium such as a compact disc (CD) or digital versatile disc (DVD). However, if data is recorded with an inaccurate pit length during a signal recording process, an asymmetric phenomenon of an RF signal is presented. In case that the pit violates an adjacent data bit region, a positive asymmetry of the signal is presented. In case that the pit is formed in a portion of the necessary data bit region, a negative asymmetry of the signal is presented.

In case that such an asymmetric phenomenon of the RF signal is presented, an inter-symbol interference (ISI) is produced while the optical reading system reads the signal recorded on the optical recording medium. The ISI makes it difficult to detect and correct a frequency error and phase error generated between the recorded data and read data. This causes the reproduced data to be distorted.

Conventionally, in order to solve this problem, a DC offset that is the asymmetric signal is removed using a digital sum value (DSV) asymmetric error correction apparatus applying a DSV algorithm as shown in FIG. 1 or a zero-crossing 3 (ZC3) asymmetric error correction apparatus applying three samples adjacent to a zero-crossing point as shown in FIGS. 2 and 3.

The conventional DSV asymmetric error correction apparatus 1 includes a binary quantization section 1, a counting section 12, a comparing section 13, an error judgment section 14, an integration section 15, a correction section 16, and a data detection section 17.

The binary quantization section 11 determines a polarity value to be "1" if an average value of two samples is larger than "0" for each digital sample, and determines the polarity value to be "−1" if the average value of the two samples is smaller than "0". The counting section 12 accumulates the detected polarity values to judge the degree of error. The comparing section 13 compares the accumulated polarity value with a predetermined threshold value.

The error judgment section 14 judges that the asymmetric error is generated if the accumulated polarity value exceeds the predetermined threshold value. The integration section 15 accumulates the detected asymmetric errors. The correction section 16 corrects an input signal Si and outputs a corrected signal Sc if the accumulated error value reaches a predetermined value. The data detection section 17 detects respective data bit values of the corrected signal Sc.

The ZC3 asymmetric error correction apparatus 2, which is another correction apparatus for correcting the asymmetric error, will now be explained with reference to FIGS. 2 and 3.

The ZC3 asymmetric error correction apparatus 2 includes a zero-crossing detection section 21, an absolute value comparing section 22, an asymmetric polarity judgement section 23, a counting section 24, a comparing section 25, an error judgment section 26, an integration section 27, a correction section 28, and a data detection section 29.

The zero-crossing detection section 21 detects a zero-crossing point by comparing sign bits of the two samples sequentially inputted. If the zero-crossing point is detected, the absolute value comparing section 22 compares absolute values of the two samples, judges that the asymmetry is generated in the sample having a smaller absolute value, and determines the sample having the smaller absolute value to be an intermediate sample. The asymmetric polarity judgement section 23 judges the polarity value of the signal from the sum of the intermediate sample and two neighboring samples, i.e., one sample at each side of the intermediate sample, thereby using the sum of three samples neighboring the zero-crossing point.

The counting section 24 accumulates the detected polarity value to judge the degree of error. The comparing section 25 compares the accumulated polarity value with the predetermined threshold value. The error judgment section 26 judges that the asymmetric error is generated if the accumulated polarity value exceeds the predetermined threshold value. The integration section 27 accumulates the detected asymmetric error. The correction section 28 corrects the input signal Si by adjusting the gain of the accumulated error value, and outputs the corrected signal Sc. The data detection section 29 detects the respective data bit values of the corrected signal Sc.

The detailed construction and operation of the zero-crossing section 21, absolute value comparing section 22, and asymmetric polarity judgement section 23 are illustrated in FIG. 3

The zero-crossing detection section 21 includes an exclusive OR gate 21a that judges the zero-crossing point from the sign bits of the two sequential samples $D2_k$ and $D3_k$. If the zero-crossing point is detected between the two sequential samples $D2_k$ and $D3_k$, the zero-crossing detection section 21 sets the detected zero-crossing point value ZC to 1.

The absolute value comparing section 22 obtains absolute values of the two sequential samples $D2_k$ and $D3_k$ between which the zero-crossing point is detected, and compares the absolute values. The absolute value comparing section 22 judges that the asymmetry is generated in the sample $D2_k$ or $D3_k$ having a smaller absolute value. For example, if $|D2_k|$ is larger than $|D3_k|$, the absolute value comparing section 22 selects $D3_k$ as the intermediate sample, and an adder 23a obtains the sum sum_1 of the intermediate sample $D3_k$, previous sample $D2_k$, and later sample $D4_k$. Meanwhile, if $|D2_k|$ is smaller than or equal to $|D3_k|$, the absolute value comparing section 22 selects $D2_k$ as the intermediate sample, and an adder 23b obtains the sum sum_2 of the intermediate sample $D2_k$, previous sample $D1_k$, and later sample $D3_k$.

A polarity judgment section 23c judges the polarity value to be negative if the detected zero-crossing value ZC is 1, and the sum_n is larger than 0. The polarity judgment section 23c judges the polarity value to be positive if the detected zero-crossing value ZC is 1, and the sum_n is smaller than or equal to 0. Here, n is 1 or 2. The polarity value obtained as above is inputted to the counting section.

The conventional DSV asymmetric error correction apparatus has an advantage that it can achieve a relatively stable operation without being greatly affected by the amount of the asymmetric polarity and the timing error value. However, since the average value of two samples should be obtained for each sample, the conventional apparatus has the disadvantage of slow correction speed as shown in FIG. 12.

Also, the conventional ZC3 asymmetric error correction apparatus, which judges the polarity using the two sample values at the zero-crossing point, can easily judge the polarity in case that the asymmetric polarity is small and the timing error is small as shown in FIG. 13. However, since it uses three samples neighboring the zero-crossing point, it has the disadvantage that it is difficult to accurately judge the polarity of the asymmetric signal in case that the environment of the optical channels is inferior. Accordingly, the amount of jitter in a normal state becomes larger during the error tracking in the correction process as shown in FIGS. 14 and 15, and thus it has the disadvantage that it is difficult to achieve a stable operation of the following PLL loop.

SUMMARY OF THE INVENTION

Accordingly, it is a primary object of the present invention to provide an asymmetric error correction apparatus and method, and clock recovering apparatus and data recovering apparatus for an optical reading system employing the same that can improve the correction speed of the asymmetric error.

Another object of the present invention is to provide an asymmetric error correction apparatus and method, and clock recovering apparatus and data recovering apparatus for an optical reading system employing the same that can achieve a stable operation even when a signal is distorted through circumstances such as increased frequency error, phase error, and amount of asymmetry.

To achieve the above objects, the present invention provides an asymmetric error correction apparatus comprising: a zero-crossing detecting means for extracting four sequential samples from a digital signal inputted from an analog-to-digital (A/D) converter and detecting a zero-crossing point from the two intermediate samples; an asymmetric error detecting means for judging an asymmetric state and an asymmetric polarity of the digital signal from a sum of the two side samples among the four samples if the zero-crossing point is detected; and a correcting means for correcting an asymmetric error of the digital signal according to the detected asymmetric polarity.

The zero-crossing detecting means detects the zero-crossing point by detecting an inversion of signs of the two intermediate samples among the four samples.

The asymmetric error detecting means includes an asymmetric state judging means for judging the asymmetric state of the digital signal by obtaining the sum of the two side samples among the four samples if the zero-crossing point is detected; and a polarity judging means for judging the asymmetric polarity of the digital signal according to the sign of the sum if the zero-crossing point is detected.

The polarity judging means judges the asymmetric polarity of the digital signal to be negative if the sum is larger than 0, while it judges the asymmetric polarity of the digital signal to be positive if the sum is smaller than or equal to 0.

The correcting means includes a polarity counter for counting the judged asymmetric polarities; a comparing means for comparing a counted value of the asymmetric polarities with a predetermined threshold value to output a result of comparison, and resetting the polarity counter if the counted value of the asymmetric polarities exceeds the threshold value; an asymmetric error generating means for generating the asymmetric error according to the result of comparison; an integrating means for integrating the generated asymmetric error; and an error correcting means for correcting the asymmetric error of the digital signal inputted from the A/D converter according to a result of integration.

In another aspect of the present invention, there is provided an asymmetric error correction method comprising the steps of extracting four sequential samples from an input digital signal and detecting a zero-crossing point from the two intermediate samples; judging an asymmetric state and an asymmetric polarity of the digital signal from a sum of the two side samples among the four samples if the zero-crossing point is detected; and correcting an asymmetric error of the digital signal according to the detected asymmetric polarity.

According to the asymmetric error correction apparatus and method as above, the asymmetric error is detected using only two samples, not for each sample or three samples, and thus they have the advantage of a high correction speed. Also, the asymmetric polarity is judged according to a sample before one timing and a sample after one timing (called an external sample) rather than two samples neighboring the zero-crossing point, without using the two intermediate samples neighboring the zero-crossing point. Accordingly, a stable operation can be achieved even if signal distortion such as an increase of the frequency error, phase error, and amount of asymmetry exists.

In still another aspect of the present invention, there is provided a clock recovering apparatus for an optical reading system for reading an analog signal from an optical recording medium, the apparatus comprising a filter for calculating a timing of a digital signal sequentially inputted from an analog-to-digital (A/D) converter; an asymmetric error corrector for extracting four sequential samples from the digital signal inputted from the filter, detecting an asymmetric error of the digital signal from a sum of the two side samples among the four samples if a zero-crossing point is detected, and correcting the detected asymmetric error; and a phase locked loop for correcting a timing error and a phase error of the asymmetric-error-corrected digital signal.

In still another aspect of the present invention, there is provided a data recovering apparatus for an optical reading system for reading an analog signal from an optical recording medium, the apparatus comprising an analog-to-digital (A/D) converter for converting the analog signal into a digital signal; a clock recovering means for correcting an asymmetric error by sequentially extracting four samples from the digital signal inputted from the A/D converter, and recovering a clock by correcting a timing error and a phase error of the asymmetric-error-corrected digital signal; and a data detector for detecting data by recovering the digital signal inputted from the A/D converter according to the recovered clock.

According to the clock recovering apparatus provided with the asymmetric error correction apparatus, it has the advantage that the time required for recovering the asymmetric error is shortened, and an accurate correction is possible, enabling easy clock recovery. Also, according to the data recovering apparatus provided with the asymmetric error correction apparatus, it has the advantage that quick data recovery can be achieved.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A data recovering apparatus A for an optical reading system for reading an analog signal from an optical recording medium of the present invention will now be described in detail with reference to FIG. 4.

Figure 1:
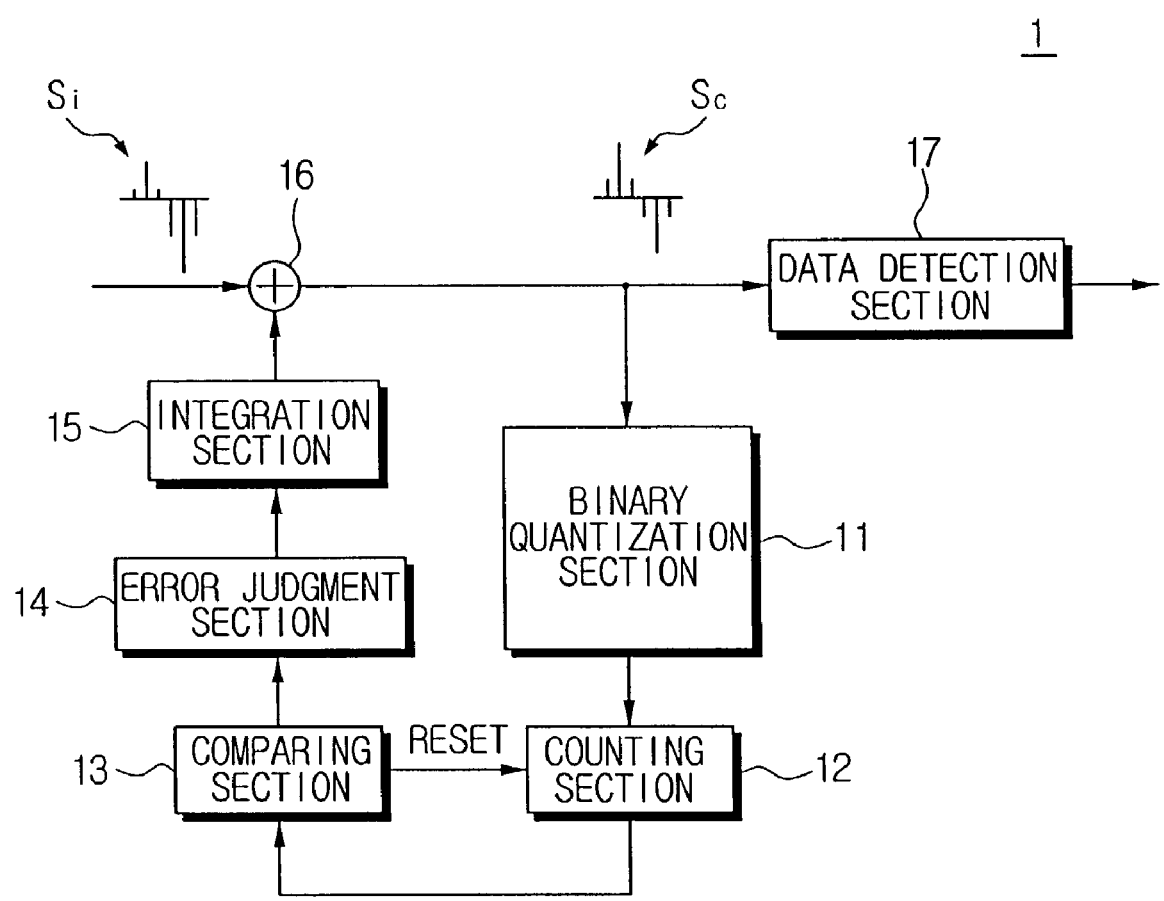
FIG. 1 is a block diagram illustrating the construction of a conventional asymmetric error correction apparatus using the DSV algorithm.
Figure 2:
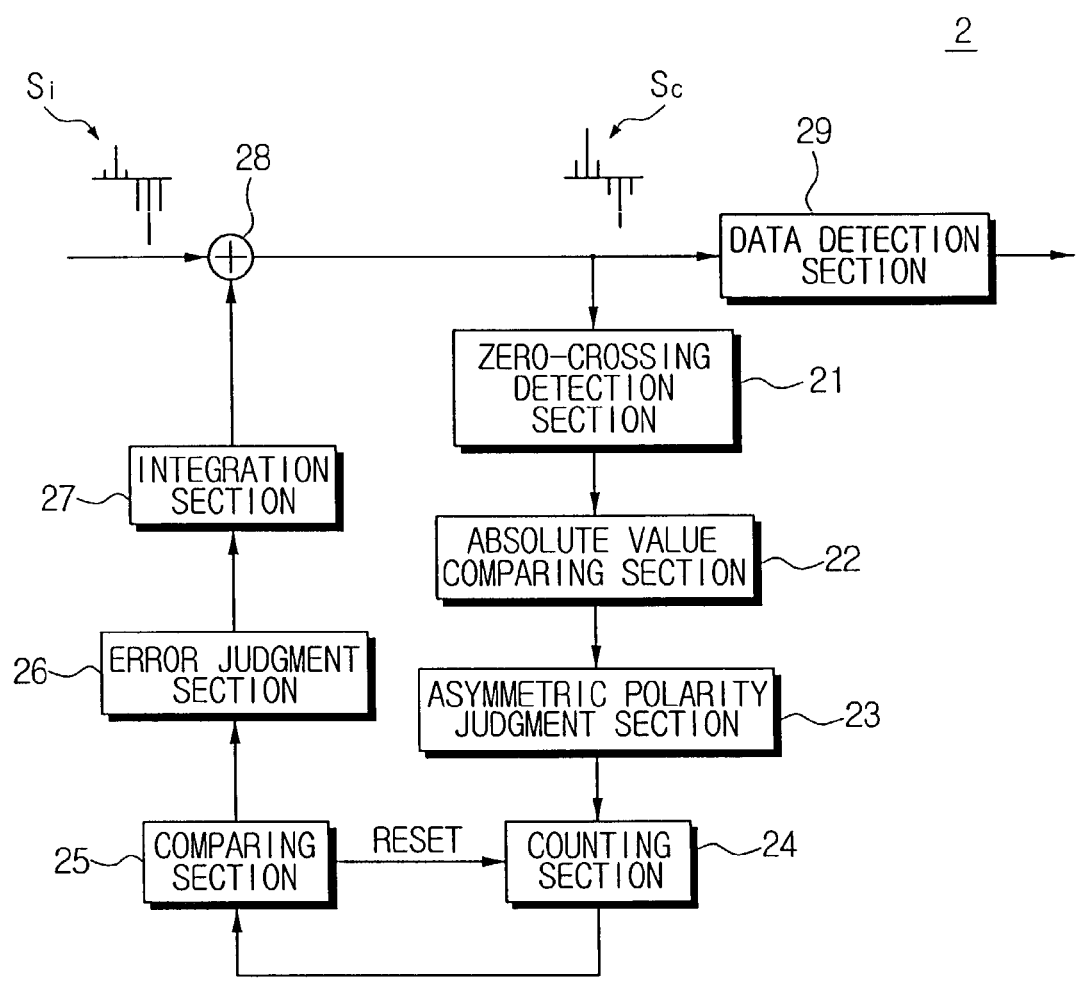
FIG. 2 is a block diagram illustrating the construction of a conventional asymmetric error correction apparatus using three-sample signal values at a zero-crossing point.
Figure 3:
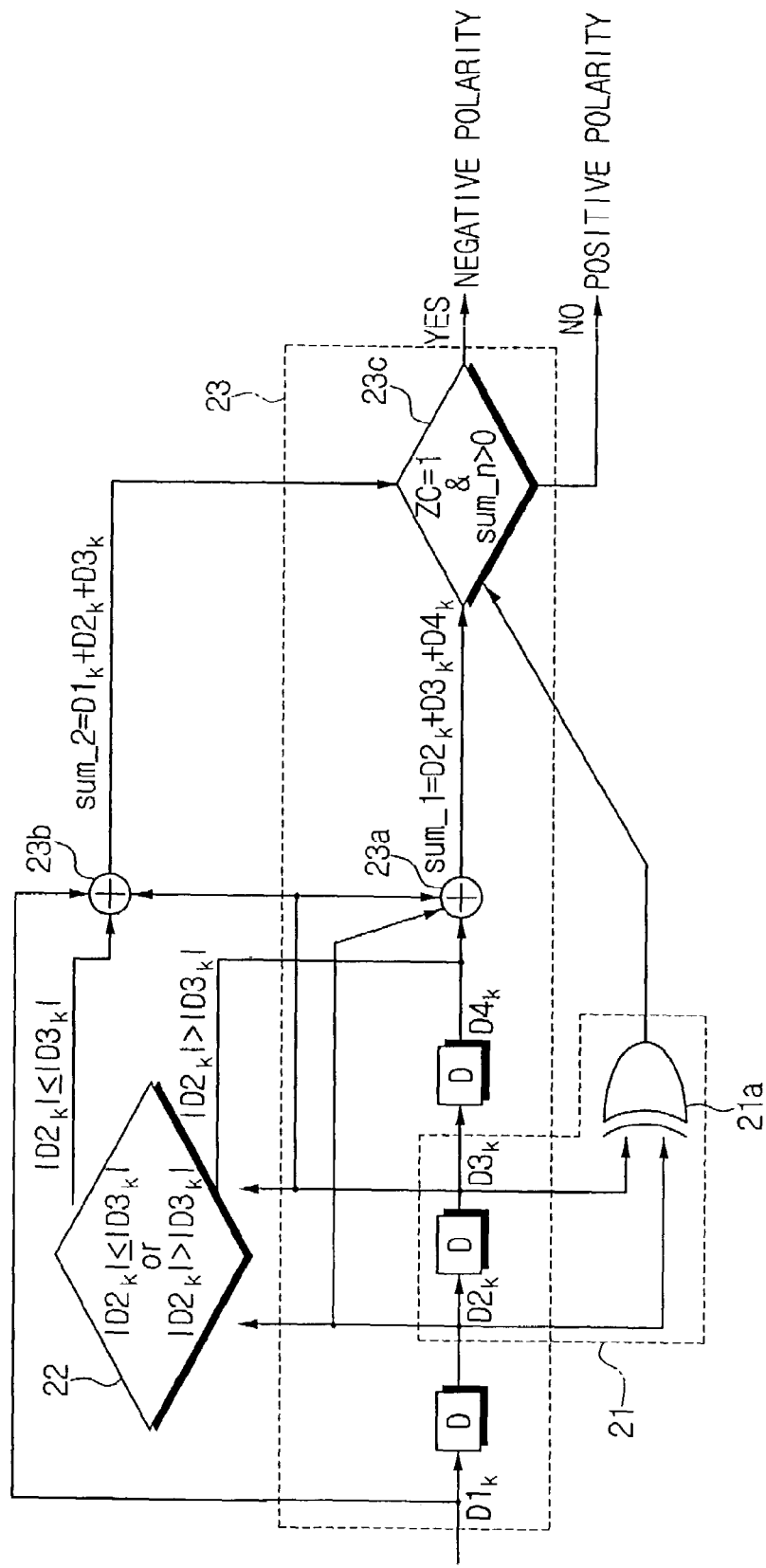
FIG. 3 is a block diagram illustrating the detailed construction of a zero-crossing detection section and an asymmetric error detection section of FIG. 2.
Figure 4:
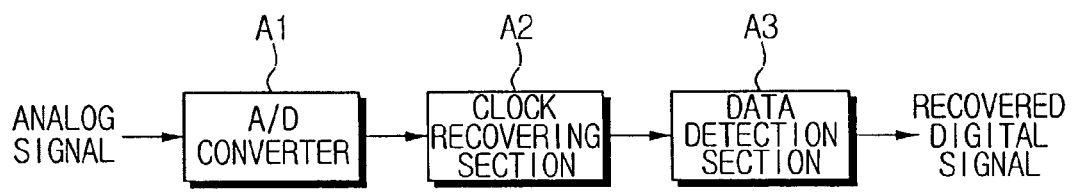
FIG. 4 is a block diagram illustrating the construction of a data recovering apparatus for an optical reading system according to a preferred embodiment of the present invention.

Referring to FIG. 4, the data recovering apparatus A for an optical reading system includes an A/D converter A1, a clock recovering section A2, and a data detection section A3.

Figure 8:
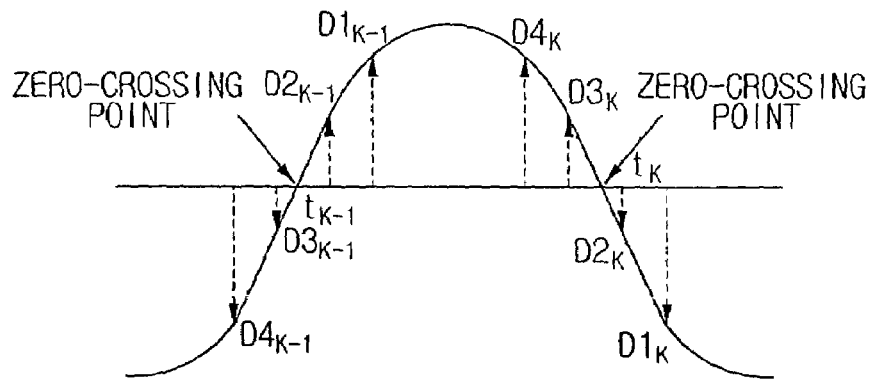
FIG. 8 is a graph illustrating positions of respective samples when the zero-crossing point is generated.

The A/D converter A1 converts the analog signal sequentially inputted into a digital signal Si. The clock recovering section S2 sequentially extracts four samples from samples of the digital signal Si inputted from the A/D converter A1. FIG. 8 illustrates the four samples $D1_k$, $D2_k$, $D3_k$, $D4_k$, or $D1_{k-1}$, $D2_{k-1}$, $D3_{k-1}$, $D4_{k-1}$ including a zero-crossing point $t_k$ or $t_{k-1}$ extracted by the clock recovering section A2.

The clock recovering section A2 corrects the asymmetric error of the digital signal Si on the basis of the sum of the two side samples $D1_k$ and $D4_k$, or $D1_{k-1}$ and $D4_{k-1}$ among the four samples $D1_k$, $D2_k$, $D3_k$, $D4_k$, or $D1_{k-1}$, $D2_{k-1}$, $D3_{k-1}$, $D4_{k-1}$. Also, the clock recovering section A2 corrects the timing error and the phase error of the asymmetric-error-corrected digital signal. The data detection section A3 detects a recovered digital signal Sc from the digital signal in which the asymmetric error, timing error, and phase error are corrected.

Figure 5:
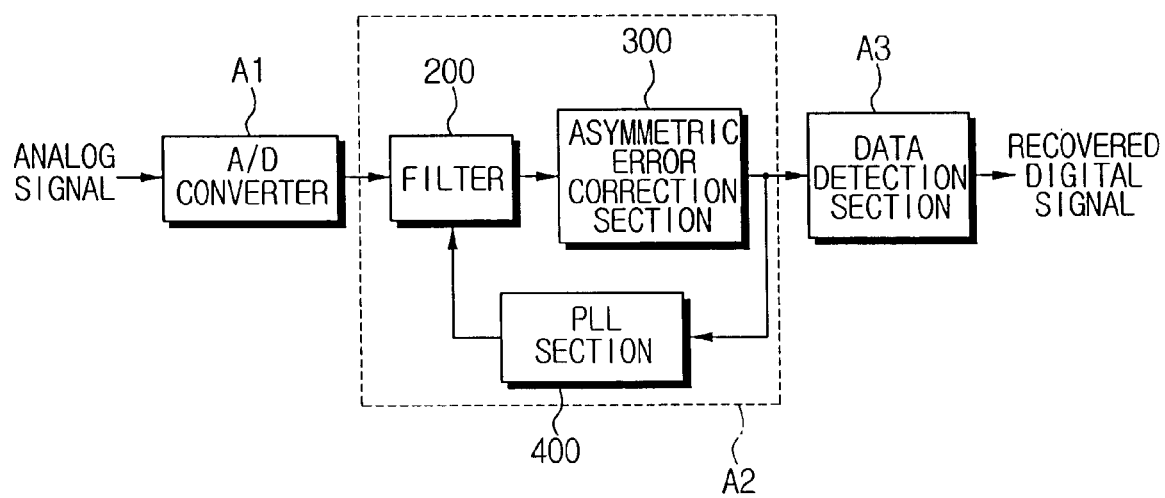
FIG. 5 is a block diagram illustrating the detailed construction of a clock recovering section of FIG. 4.

Referring to FIG. 5, the detailed construction and operation of the clock recovering section A2 will be explained. In the embodiment of the present invention, it is assumed that the zero-crossing point is detected at $t_k$.

The clock recovering section A2 includes a filter 200, an asymmetric error correction section 300, and a PLL section 400. The filter 200 calculates the timing of the digital signal inputted from the A/D converter A1. The filter can be implemented using an interpolating filter.

The asymmetric error correction section 300 sequentially extracts the four samples $D1_k$, $D2_k$, $D3_k$, and $D4_k$ from the digital signal inputted from the filter 200. The asymmetric error correction section 300 detects the zero-crossing point in case that the sign bits of the two samples $D2_k$ and $D3_k$ among the four samples $D1_k$, $D2_k$, $D3_k$, and $D4_k$, are inverted. The asymmetric error correction section 300 detects the asymmetric error of the digital signal from the sum of the two side samples $D1_k$ and $D4_k$ among the four samples $D1_k$, $D2_k$, $D3_k$, and $D4_k$. The asymmetric error correction section 300 corrects the asymmetric error with respect to the digital signal.

The PLL section 400 corrects the timing error and the phase error of the asymmetric-error-corrected digital signal, and outputs the corrected digital signal to the filter 200.

Figure 6:
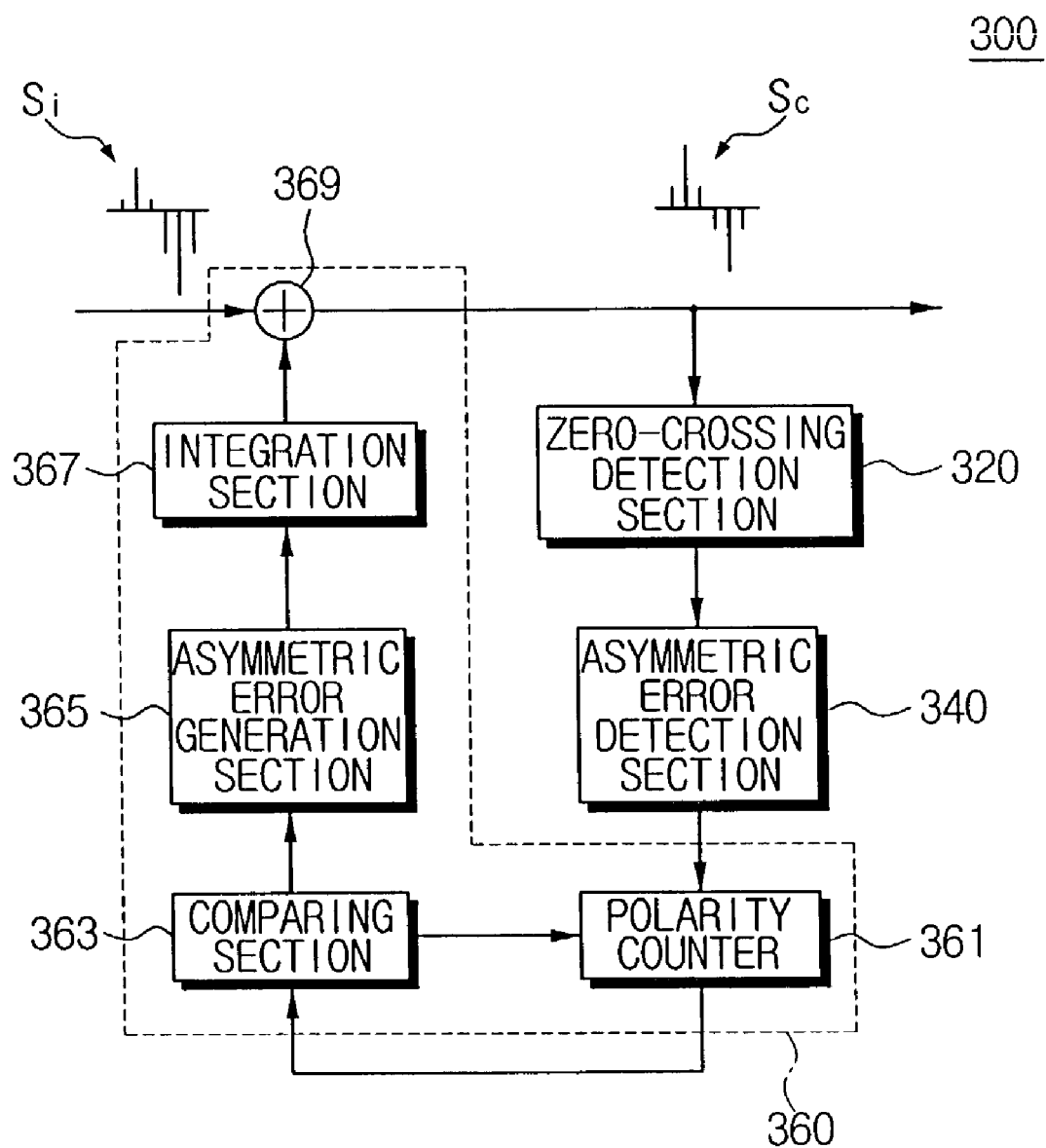
FIG. 6 is a block diagram illustrating the detailed construction of an asymmetric error correction section of FIG. 5.

The detailed construction and operation of the asymmetric error correction section 300 will be explained with reference to FIGS. 6 to 8.

The asymmetric error correction section 300 includes a zero-crossing detection section 320, an asymmetric error detection section 340, and a correction section 360. The zero-crossing detection section 320 detects the zero-crossing point from the sign bits of the digital signal Si sequentially inputted from the A/D converter A1. The zero-crossing detection section 320 may comprise an exclusive OR gate 320a as shown in FIG. 7.

The zero-crossing detection section 320 sequentially extracts the four samples $D1_k$, $D2_k$, $D3_k$, and $D4_k$ from the digital signal inputted from the A/D converter A1. The zero-crossing detection section 320 detects the zero-crossing point by exclusive-OR-gating the sign bits of the two intermediate samples $D2_k$ and $D3_k$ among the four samples $D1_k$, $D2_k$, $D3_k$, and $D4_k$. The four sequential samples $D1_k$, $D2_k$, $D3_k$, and $D4_k$ are signals that have passed delay elements 340a, 340b, and 340c, respectively. Referring to FIG. 8, it can be recognized that the zero-crossing point is generated between the two intermediate samples $D2_k$ and $D3_k$ among the four sequential samples $D1_k$, $D2_k$, $D3_k$, and $D4_k$ at the time point of $t_k$.

Figure 7:
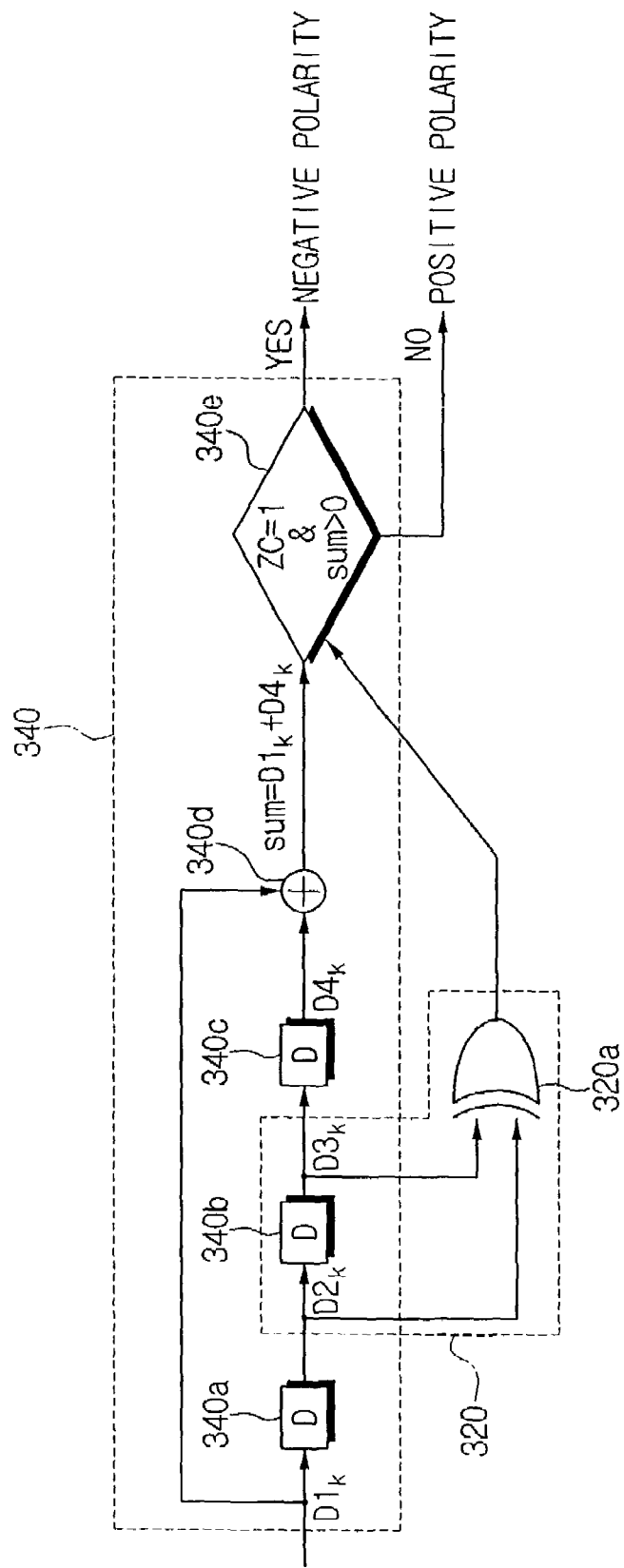
FIG. 7 is a block diagram illustrating the detailed construction of a zero-crossing detection section and an asymmetric error detection section of FIG. 6.

Referring to FIGS. 7 and 8, if the zero-crossing point is generated at the time point of $t_k$, the zero-crossing detection variable ZC is set to 1.

If the zero-crossing point is detected, the asymmetric error detection section 340 judges the asymmetric state and the asymmetric polarity of the digital signal from the sum of the two side samples $D1_k$ and $D4_k$ among the four samples $D1_k$, $D2_k$, $D3_k$, and $D4_k$.

The asymmetric error detection section 340 includes an asymmetric state judgment section 340d and a polarity judgment section 340e. The asymmetric state judgment section 340d may be implemented using an adder. If the zero-crossing point is detected, the asymmetric state judgment section 340 calculates the sum of the two side samples $D1_k$ and $D4_k$ among the four samples $D1_k$, $D2_k$, $D3_k$, and $D4_k$. The asymmetric state judgment section 340d judges the digital signal to be asymmetric if the sum is not 0, while it judges the digital signal to be symmetric if the sum is 0.

If the zero-crossing point is detected, the polarity judgment section 340e judges the asymmetric polarity of the digital signal according to the sign of the sum in case that the zero-crossing detection variable ZC is set to 1. If the sum is larger than 0, the polarity judgment section 340e judges the polarity of the digital signal to be negative, and sets +1 as the polarity value. Meanwhile, if the sum is smaller than or equal to 0, the polarity judgment section 340e judges the polarity of the digital signal to be positive, and sets −1 as the polarity value. In principle, the sum being 0 means that the asymmetry is not generated. However, practically, it is very rare for the sum to be 0, and does not affect the counting of the asymmetric polarity values. Accordingly, the operation of the asymmetric error correction section is not affected by the case that the sum is 0 even if the polarity is judged to be either negative or positive.

The correction section 360 corrects the asymmetric polarity of the digital signal according to the asymmetric polarity. The correction section 360 includes a polarity counter 361, a comparing section 363, an asymmetric error generation section 365, an integration section 367, and an error correction section 369. The polarity counter 361 obtains and stores the counted value of asymmetric polarities by accumulating the polarity values outputted from the polarity judgment section 340e.

The comparing section 363 compares the counted value of the asymmetric polarities with the predetermined threshold value, and outputs the result of comparison. If the counted value of the polarities exceeds the threshold value, the comparing section 363 resets the polarity counter 361.

By resetting the polarity counter 361 after the correction is performed, the accuracy of the judgment is secured, and the jitter in the normal state is prevented during the tracking of the asymmetric signal.

The asymmetric error generation section 365 generates the asymmetric error according to the result of comparison. That is, if the counted value of the asymmetric polarities exceeds the threshold value, the asymmetric error generation section 365 generates the asymmetric error having the opposite sign value. The threshold value may be set as an optimum value considering the correction speed and the normal state value during the tracking.

The integration section 367 integrates the generated asymmetric error. The error correction section 369 corrects the asymmetric error of the digital signal Si inputted from the A/D converter A1 according to the result of integration, and outputs the corrected digital signal Sc.

The clock recovering section A2 and the asymmetric error correction section 300 can be implemented as separate devices.

Figure 9:
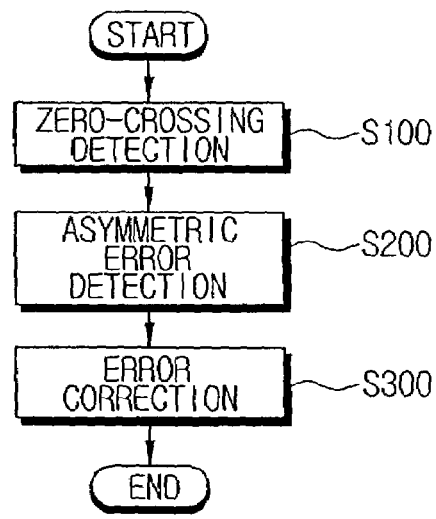
FIG. 9 is a flowchart illustrating an asymmetric error correction method according to a preferred embodiment of the present invention.
Figure 10:
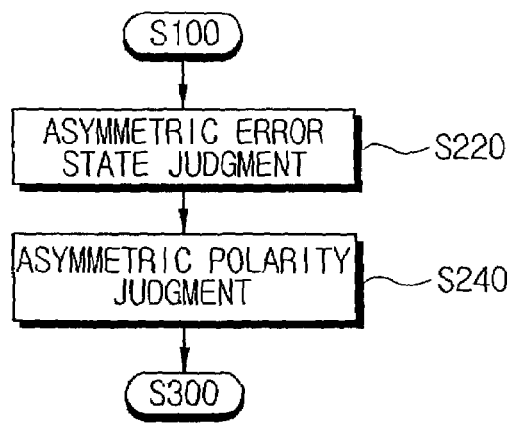
FIG. 10 is a flowchart illustrating the detailed process of an asymmetric error detection step of FIG. 9.
Figure 11:
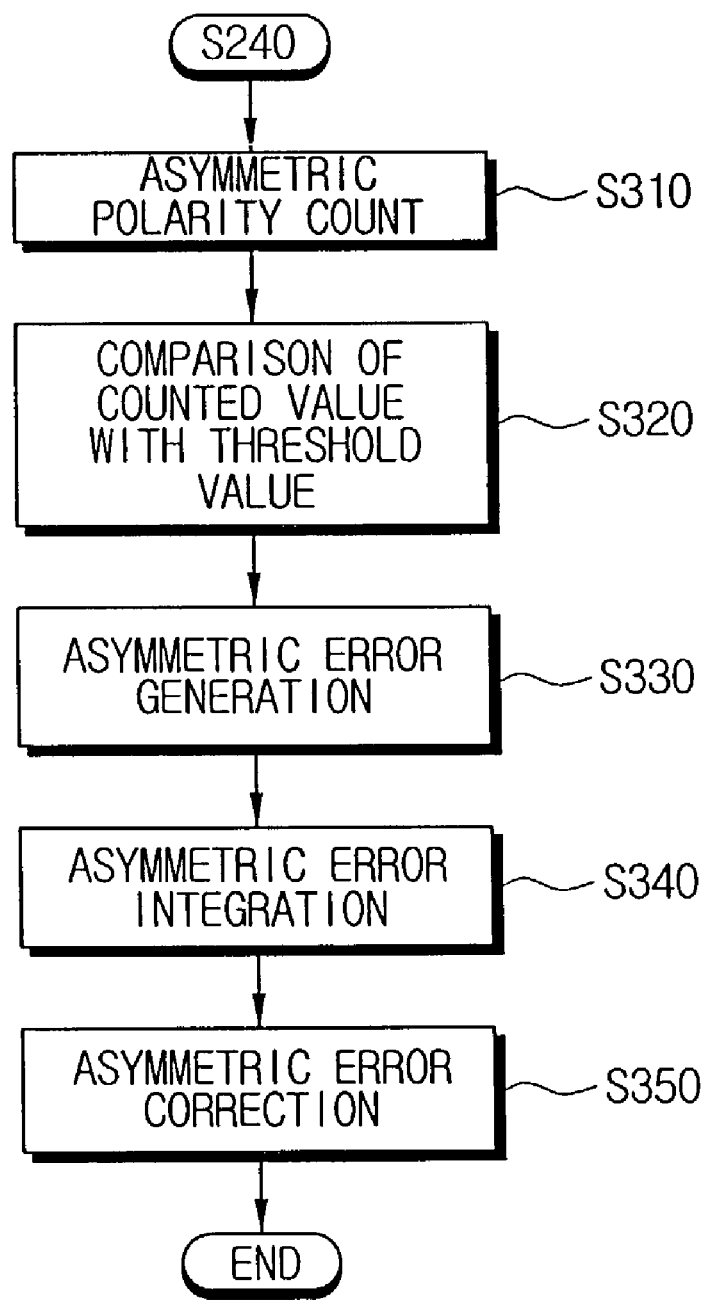
FIG. 11 is a flowchart illustrating the detailed process of an error correction step of FIG. 9.

Hereinafter, the asymmetric error correction method according to the preferred embodiment of the present invention will be explained with reference to FIGS. 9 to 11. Since the asymmetric error correction method is similar to the operation of the asymmetric error correction section 300, the detailed explanation thereof will be omitted.

The asymmetric error correction method comprises a zero-crossing detection step S100, an asymmetric polarity detection step S200, and an error correction step S300. The zero-crossing detection step S100 sequentially extracts the four samples from the input digital signal, and detects the zero-crossing point by the sign bits of the two intermediate samples. The asymmetric polarity detection step S200 judges the asymmetric state and the asymmetric polarity of the digital signal from the sum of the two side samples among the four samples if the zero-crossing point is detected.

The asymmetric polarity detection step S200 includes an asymmetric error state judgment step S220 and an asymmetric polarity judgment step S240. The asymmetric error state judgment step S220 calculates the sum of the two side samples among the four samples if the zero-crossing point is detected. The asymmetric error state judgment step S220 judges the asymmetric state of the digital signal from the sum of the two samples.

If the zero-crossing point is detected, the asymmetric polarity judgment step S240 judges the polarity of the digital signal according to the sign of the sum. The asymmetric polarity judgment step S240 judges the polarity of the digital signal to be negative if the sum is larger than 0, while it judges the polarity of the digital signal to be positive if the sum is smaller than or equal to 0.

The error correction step S300 corrects the asymmetric error of the digital signal according to the result of the polarity judgment. The error correction step S300 includes a step S310 of counting the asymmetric polarities determined at the asymmetric polarity judgment step S240, a comparing step S320, an asymmetric error generation step S330, an asymmetric error integration step S340, and an asymmetric error correction step S350.

The comparing step S320 compares the counted value of the asymmetric polarities with the predetermined threshold value, and outputs the result of comparison. The comparing step S320 resets the polarity counted value if the polarity counted value exceeds the threshold value. The asymmetric error generation step S330 generates the asymmetric error corresponding to the result of comparison.

The asymmetric error integration step S340 integrates the generated asymmetric error. The asymmetric error correction step S350 corrects the asymmetric error of the digital signal according to the result of integration.

Referring to FIGS. 12 to 17, the comparison result of the performance of the conventional DSC and ZC3 asymmetric error correction method with that of the asymmetric error correction method according to the present invention will be explained.

Figure 12:
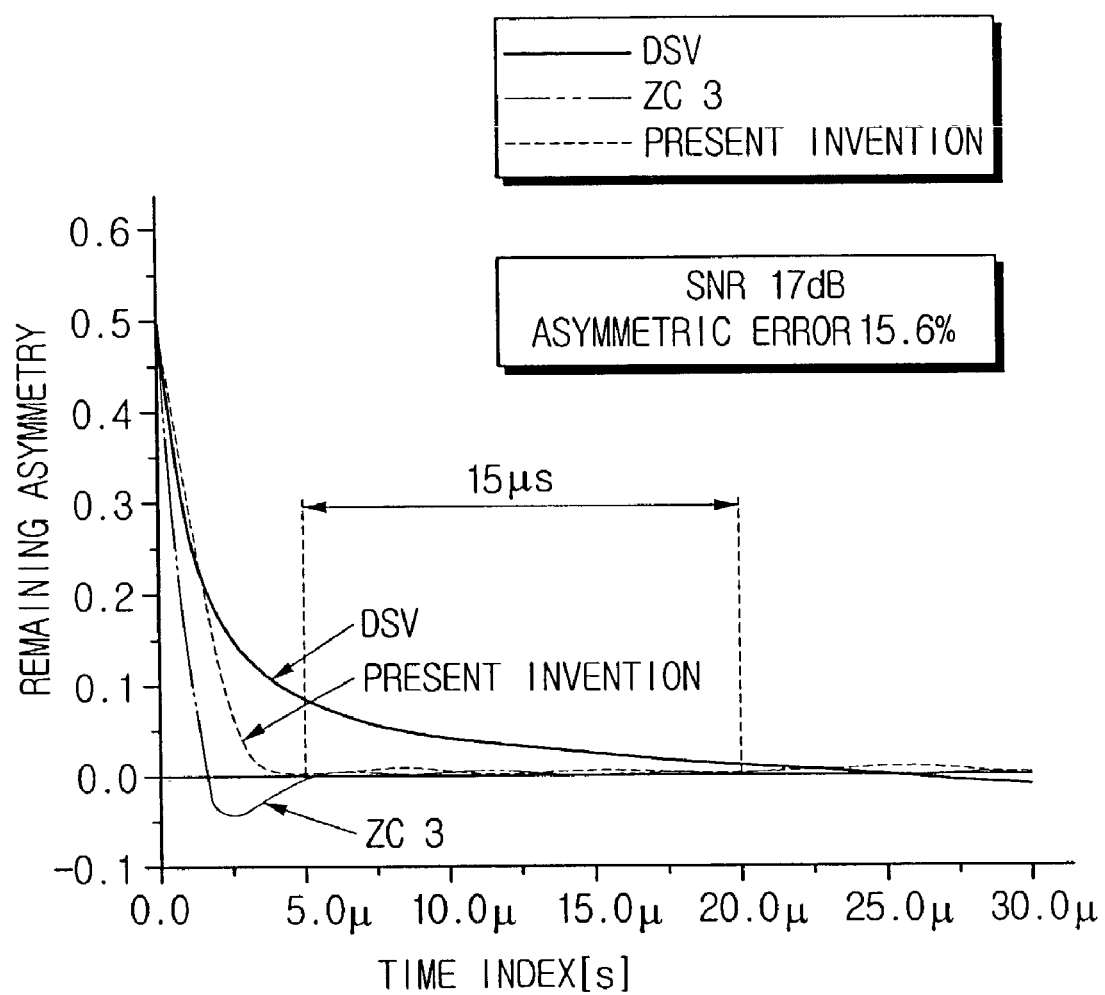
FIG. 12 is a graph illustrating the correction speed of the asymmetric error correction apparatuses according to the prior art and the present invention in case that the asymmetric rate (ASM) is 15.6% and the error value is estimated at optimum.

FIG. 12 is a graph illustrating the tracking time when the remaining asymmetric amount converges into 0 through the respective methods in the environment that the SNR is 17 dB and the asymmetric error is 15.6%. As shown in FIG. 12, in case of using the parameter having the optimum tracking performance for the respective methods, the correction speed achieved by the method according to the present invention is faster than that of the conventional DSV method by 15 μs. Accordingly, the method according to the present invention is suitable for being applied to a system for reading a signal from a high-density optical recording medium at a high speed, and can secure a stable operation.

Figure 13:
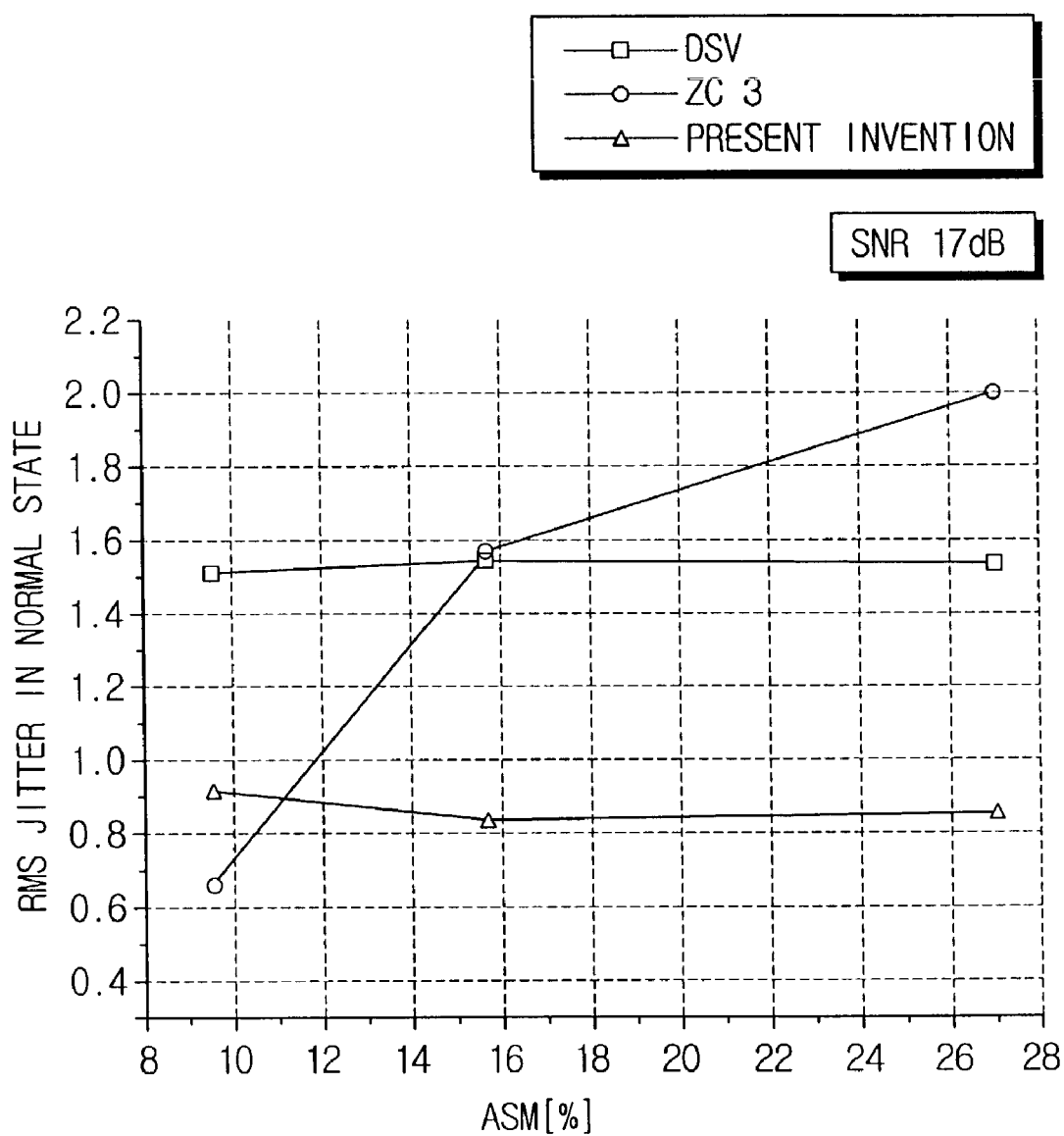
FIG. 13 is a graph illustrating the jitter amount in a normal state during the error tracking of the asymmetric error correction apparatuses according to the prior art and the present invention in case that the tracking speed is identical and the timing error does not exist.
Figure 14:
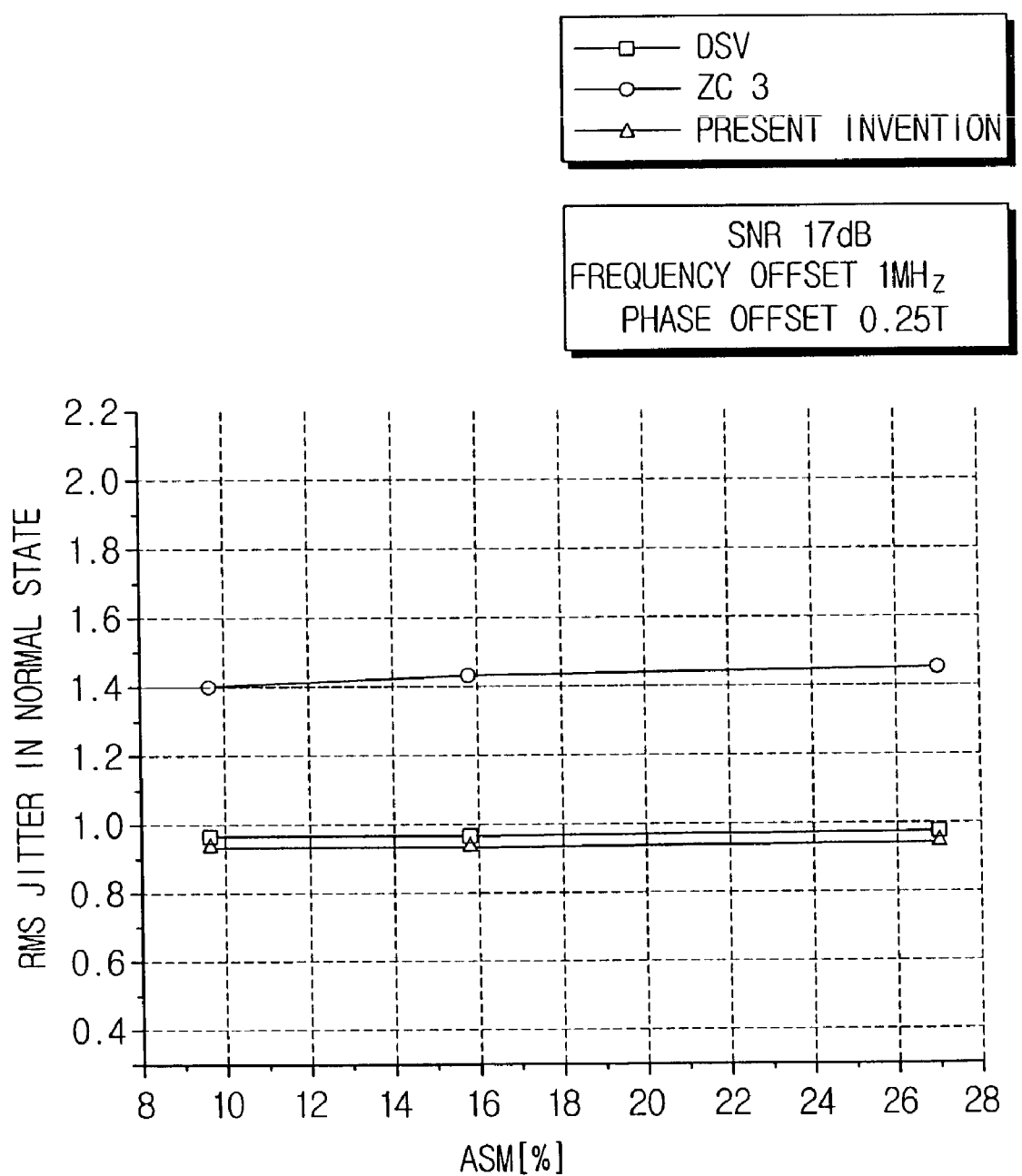
FIG. 14 is a graph illustrating the jitter amount in a normal state according to the asymmetric rate (ASM) during the error tracking of the asymmetric error correction apparatuses according to the prior art and the present invention in case that the tracking speed is identical and the timing error exists.
Figure 15:
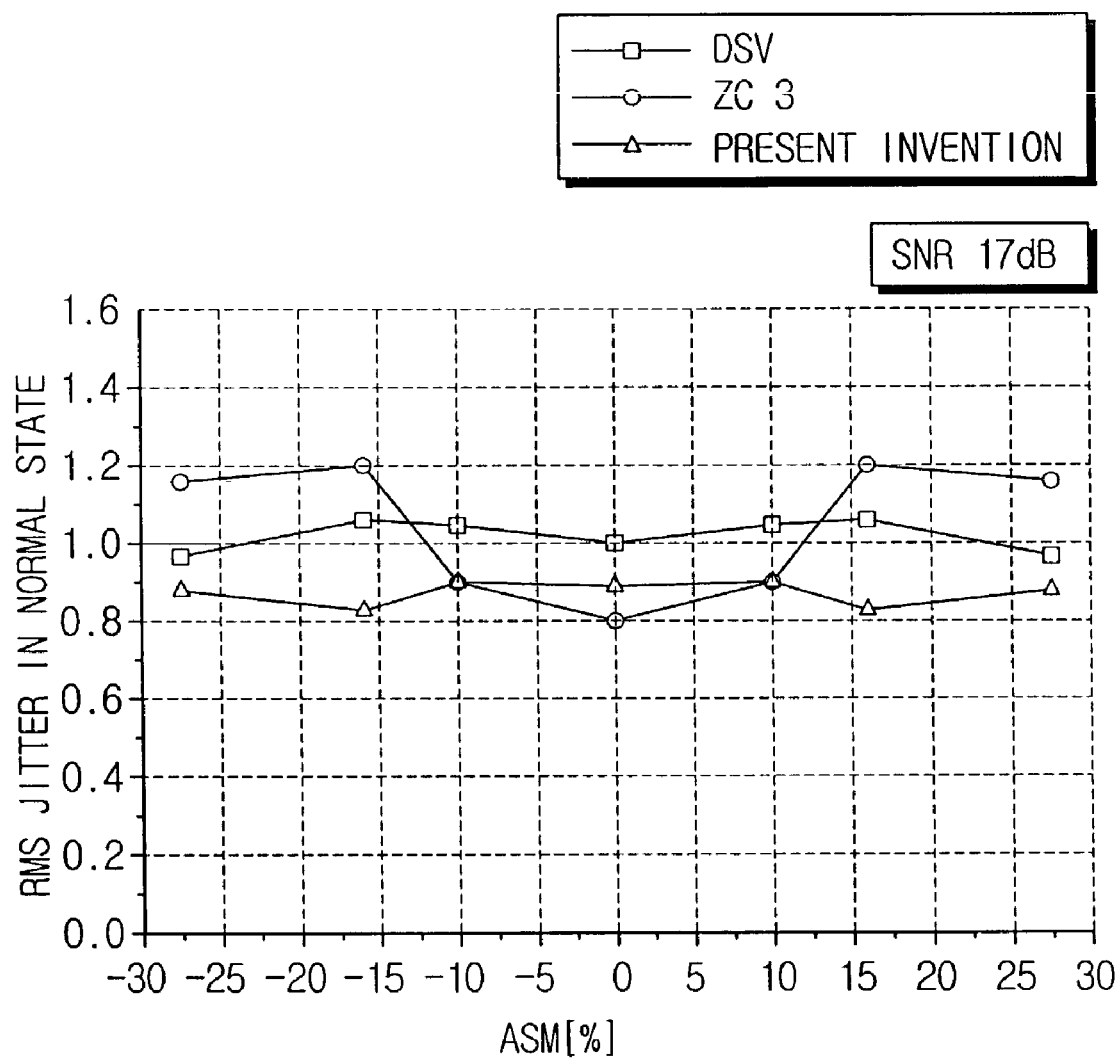
FIG. 15 is a graph illustrating the jitter amount in a normal state according to the asymmetric rate (ASM) during the error tracking of the asymmetric error correction apparatuses according to the prior art and the present invention in case that the timing error does not exist and an optimum error value tracking is possible.

FIG. 13 is a graph illustrating the RMS jitter values in a normal state according to the asymmetric rate (ASM) in the environment that the conventional and present methods have the same tracking speed, the SNR is 17 dB, and the timing error does not exist. FIG. 14 is a graph illustrating the RMS jitter values in a normal state according to the asymmetric rate (ASM) in the environment that the conventional and the present methods have the same tracking speed, and the timing error exists. FIG. 15 is a graph illustrating the RMS jitter values in a normal state according to the asymmetric rate (ASM) in the environment that the conventional and present methods have the respective optimum tracking conditions, the SNR is 17 dB, and the timing error does not exist.

Referring to FIGS. 13 to 15, the asymmetric error correction method according to the present invention enables stable operation and accurate polarity judgment in an optical reading system in which the degree of asymmetry is great and phase and frequency errors exist. The reason why the asymmetric error correction method according to the present invention is not affected by the frequency error and the phase error is that it uses the samples that are not greatly affected by the timing error and the AWGN. That is, the asymmetric error correction method according to the present invention uses the zero-crossing point in the same manner as the conventional ZC3 method.

However, the conventional ZC3 method uses the sample values neighboring the zero-crossing point, which are greatly affected by the timing error and AWGN, for judgment of the asymmetric polarity. On the contrary, the asymmetric error correction method according to the present invention does not use the two samples neighboring the zero-crossing point, but judges the asymmetric polarity according to the sum of the sample before one timing and the sample (called the external sample) after one timing rather than the two samples neighboring the zero-crossing point. Accordingly, it can achieve stable operation even if signal distortion such as increased frequency error, phase error, and amount of asymmetry exists.

Figure 16:
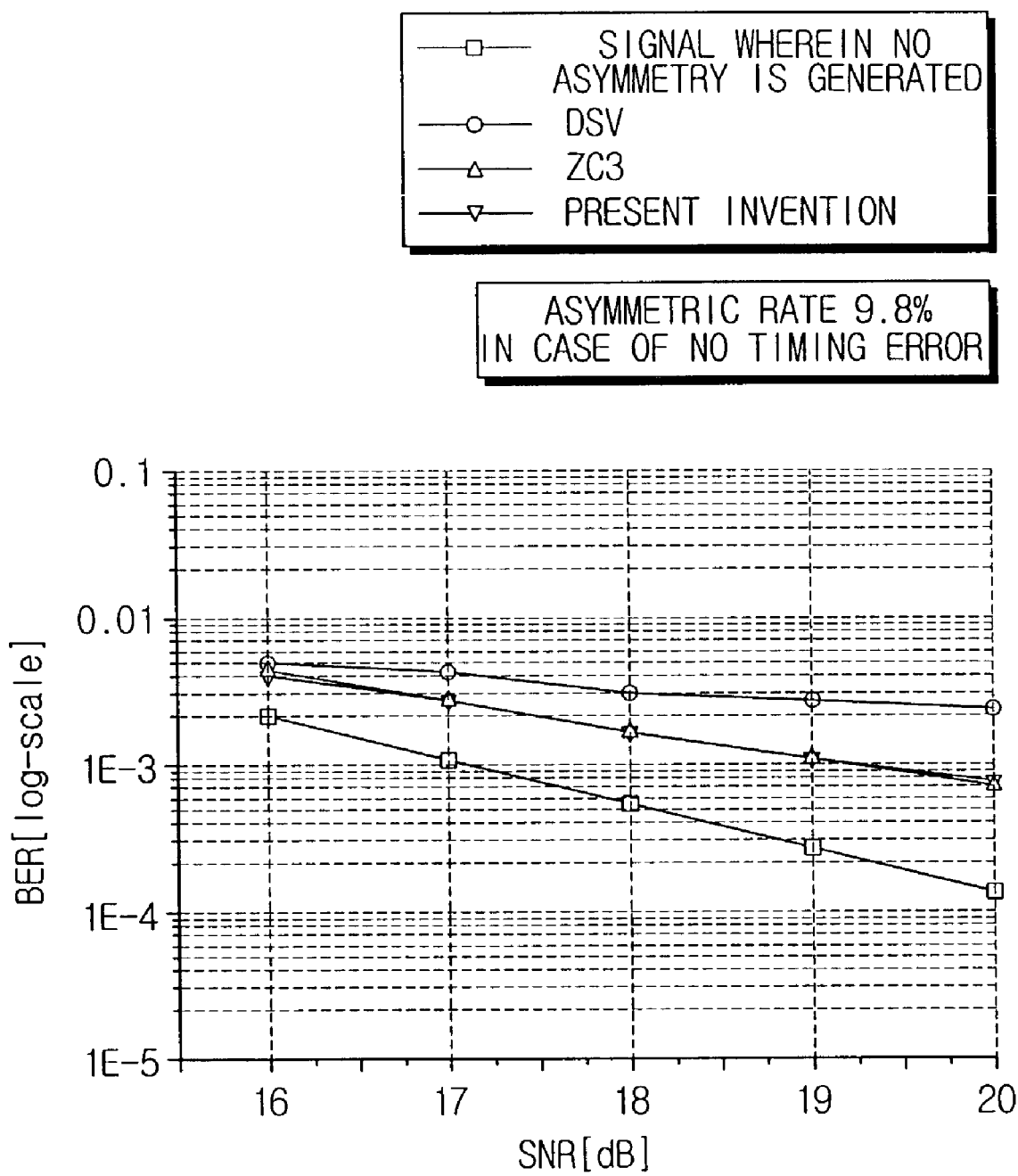
FIG. 16 is a graph illustrating the bit error rate (BER) of the asymmetric error correction apparatuses according to the prior art and the present invention when the asymmetric rate (ASM) is 9.8% in case that the timing error does not exist and an optimum error value tracking is possible.
Figure 17:
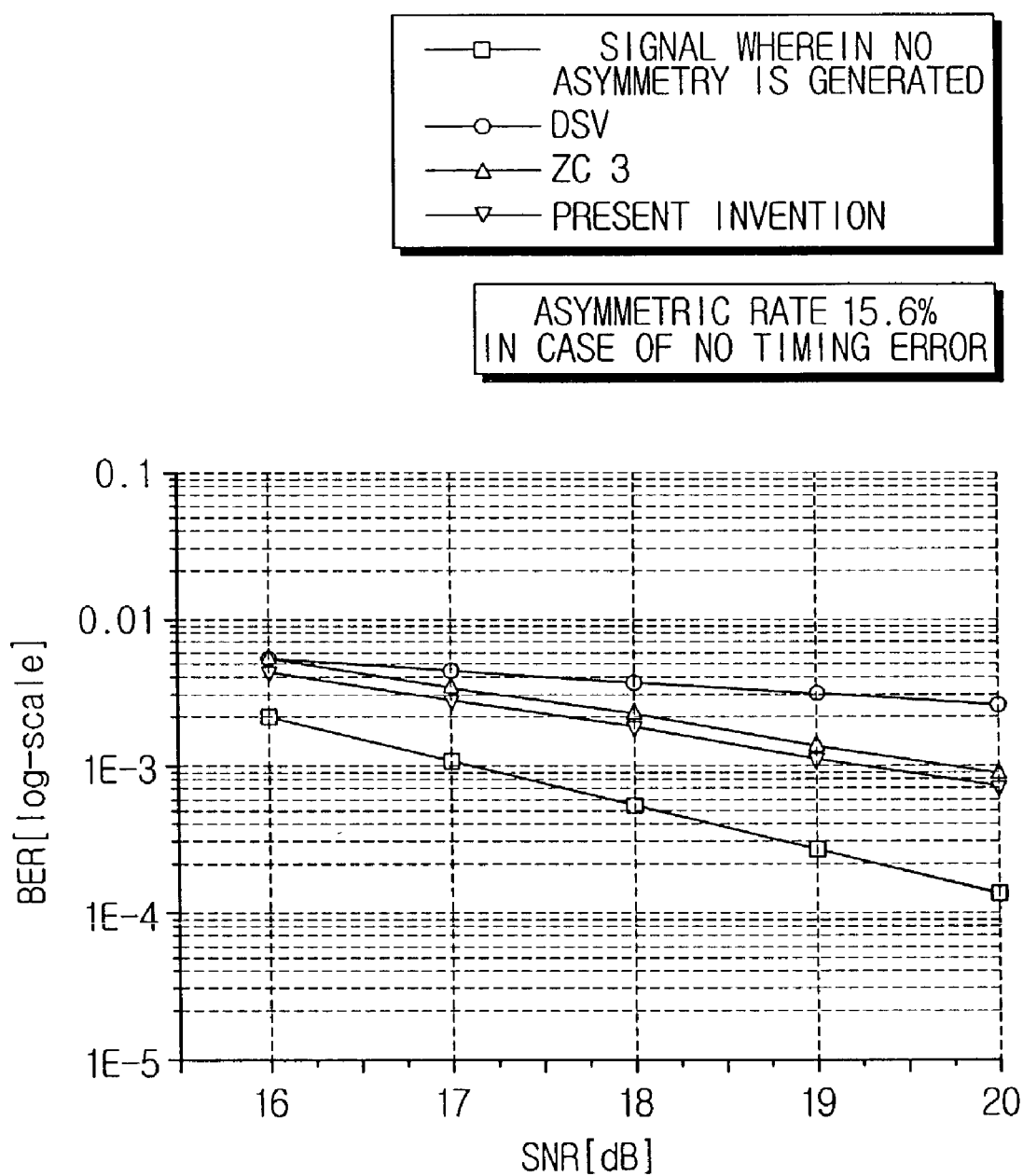
FIG. 17 is a graph illustrating the bit error rate (BER) of the asymmetric error correction apparatuses according to the prior art and the present invention when the asymmetric rate (ASM) is 15.6% in case that the timing error does not exist and an optimum error value tracking is possible.

FIG. 16 is a graph illustrating the bit error rate (BER) performance of the asymmetric error correction apparatuses according to the prior art and the present invention according to the variation of the SNR value [dB] when the asymmetric rate (ASM) is 9.8% in case that the timing error does not exist and the optimum error value tracking condition is satisfied. FIG. 17 is a graph illustrating the bit error rate (BER) performance of the asymmetric error correction apparatuses according to the prior art and the present invention according to the variation of the SNR value [dB] when the asymmetric rate (ASM) is 15.6% in case that the timing error does not exist and the optimum error value tracking condition is satisfied.

When the ASM is 9.8%, the BER performance of the asymmetric error correction apparatus and method according to the present invention is far better in comparison to the conventional DSV method. Also, when the ASM is 15.6%, the jitter performance and the BER performance of the asymmetric error correction apparatus and method according to the present invention are most superior.

As described above, the present invention detects the asymmetric error only in case that the zero-crossing point is detected from the two samples among the four sequential samples. Also, the present invention does not use the two intermediate samples neighboring the zero-crossing point, but judges the asymmetric polarity according to the sum of the sample before one timing and the sample (called the external sample) after one timing. Accordingly, it can achieve stable operation even if signal distortion such as increased frequency error, phase error, and amount of asymmetry exists.

Also, the asymmetric error correction apparatus and method according to the present invention enable stable operation and accurate polarity judgment in an optical reading system in which the degree of asymmetry is great and the phase and frequency errors exist. That is, when the ASM is 15.6%, the SNR margin of the asymmetric error correction apparatus and method according to the present invention is higher than the conventional ZC3 method by about 0.5 dB, and higher than the conventional DSV method by about 2.2 dB.

Also, in case of using the parameter having the optimum tracking performance, the correction speed achieved by the asymmetric error correction apparatus and method according to the present invention is faster than that of the conventional DSV method by about 15 μs. Accordingly, the present invention is suitable to being applied to a system for reading a signal from a high-density optical recording medium at a high speed, and can secure a stable operation by more rapidly correcting the distorted input data. Further, since the external sample value is varied according to the variation of the signal level, the present invention can reduce the error in judging the polarity in comparison to the conventional ZC3 method using the three samples neighboring the zero-crossing point.

Although the preferred embodiment of the present invention has been described, it is understood that the present invention should not be limited to this preferred embodiment but various changes and modifications can be made by one skilled in the art within the spirit and scope of the present invention as hereinafter claimed.

What is claimed is:

1. An asymmetric error correction apparatus comprising:
   a zero-crossing detector which extracts four sequential samples, including two intermediate samples and two side samples, from a digital signal inputted from an analog-to-digital (A/D) converter and detects a zero-crossing point from the two intermediate samples;
   an asymmetric error detector which judges an asymmetric state and an asymmetric polarity of the digital signal from a sum of the two side samples among the four samples if the zero-crossing point is detected; and a correcting unit which corrects an asymmetric error of the digital signal according to the detected asymmetric polarity.

2. The apparatus as claimed in claim 1, wherein the zero-crossing detector detects the zero-crossing point by detecting an inversion state of signs of the two intermediate samples among the four samples.

3. The apparatus as claimed in claim 2, wherein the asymmetric error detector comprises:
an asymmetric state judging unit which judges the asymmetric state of the digital signal by obtaining the sum of the two side samples among the four samples if the zero-crossing point is detected; and
a polarity judging unit which judges the asymmetric polarity of the digital signal according to the sign of the sum if the zero-crossing point is detected.

4. The apparatus as claimed in claim 1, wherein the asymmetric error detector comprises:
an asymmetric state judging unit which judges the asymmetric state of the digital signal by obtaining the sum of the two side samples among the four samples if the zero-crossing point is detected; and
a polarity judging unit which judges the asymmetric polarity of the digital signal according to the sign of the sum if the zero-crossing point is detected.

5. The apparatus as claimed in claim 1, wherein the correcting unit comprises:
a polarity counter for counting the judged asymmetric polarities;
a comparing unit which compares a counted value of the asymmetric polarities with a predetermined threshold value to output a result of comparison, and resets the polarity counter if the counted value of the asymmetric polarities exceeds the threshold value;
an asymmetric error generator which generates the asymmetric error according to the result of comparison;
an integrating unit which integrates the generated asymmetric error; and
an error corrector which corrects the asymmetric error of the digital signal inputted from the A/D converter according to a result of integration.

6. A clock recovering apparatus for an optical reading system for reading an analog signal from an optical recording medium, the apparatus comprising:
a filter for calculating a timing of a digital signal sequentially inputted from an analog-to-digital (A/D) converter;
an asymmetric error corrector which extracts four sequential samples, including two intermediate samples and two side samples, from the digital signal inputted from the filter, detects an asymmetric error of the digital signal from a sum of the two side samples among the four samples if a zero-crossing point is detected, and corrects the detected asymmetric error; and
a phase locked loop for correcting a timing error and a phase error of the asymmetric-error-corrected digital signal.

7. The apparatus as claimed in claim 6, wherein the asymmetric error corrector comprises:
a zero-crossing detector which extracts the four sequential samples from the digital signal inputted from the A/D converter and detects the zero-crossing point from the two intermediate samples;
an asymmetric error detector which judges an asymmetric state and an asymmetric polarity of the digital signal from a sum of the two side samples among the four samples if the zero-crossing point is detected; and
a correcting unit which corrects the asymmetric error of the digital signal according to the detected asymmetric polarity.

8. The apparatus as claimed in claim 7, wherein the correcting unit comprises:
a polarity counter for counting the judged asymmetric polarities;
a comparing unit which compares a counted value of the asymmetric polarities with a predetermined threshold value to output a result of comparison, and resets the polarity counter if the counted value of the asymmetric polarities exceeds the threshold value;
an asymmetric error generator which generates the asymmetric error according to the result of comparison;
an integrating unit which integrates the generated asymmetric error; and
an error correcting unit which corrects the asymmetric error of the digital signal inputted from the A/D converter according to a result of integration.

9. A data recovering apparatus for an optical reading system for reading an analog signal from an optical recording medium, the apparatus comprising:
an analog-to-digital (A/D) converter for converting the analog signal into a digital signal;
a clock recovering unit which corrects an asymmetric error by sequentially extracting four samples from the digital signal inputted from the A/D converter, and recovers a clock by correcting a timing error and a phase error of the asymmetric-error-corrected digital signal; and
a data detector which detects data by recovering the digital signal inputted from the A/D converter according to the recovered clock.

10. The apparatus as claimed in claim 9, wherein the clock recovering unit comprises:
a filter for calculating a timing of the digital signal sequentially inputted from the A/D converter;
an asymmetric error corrector for extracting the four sequential samples from the digital signal inputted from the filter, detecting a zero-crossing point using two intermediate samples among the four samples,detecting the asymmetric error of the digital signal from a sum of the two side samples among the four samples if a zero-crossing point is detected, and correcting the detected asymmetric error; and
a phase locked loop for correcting the timing error and the phase error of the asymmetric-error-corrected digital signal.

11. The apparatus as claimed in claim 10, wherein the asymmetric error corrector comprises:
a zero-crossing detector which extracts the four sequential samples from the digital signal inputted from the A/D converter and detects the zero-crossing point from the two intermediate samples;
an asymmetric error detector which judges an asymmetric state and an asymmetric polarity of the digital signal from a sum of the two side samples among the four samples if the zero-crossing point is detected; and
a correcting unit which corrects the asymmetric error of the digital signal according to the detected asymmetric polarity.

12. The apparatus as claimed in claim 11, wherein the correcting unit comprises:
a polarity counter for counting the judged asymmetric polarities;
a comparing unit which compares a counted value of the asymmetric polarities with a predetermined threshold value to output a result of comparison, and resets the polarity counter if the counted value of the asymmetric polarities exceeds the threshold value;

an asymmetric error generating unit which generates the asymmetric error according to the result of comparison;

an integrating unit which integrates the generated asymmetric error; and an error correcting unit which corrects the asymmetric error of the digital signal inputted from the A/D converter according to a result of integration.

13. An asymmetric error correction method comprising the steps of:
   (a) extracting four sequential samples, including two intermediate samples and two side samples, from an input digital signal and detecting a zero crossing point from the two intermediate samples of the four samples;
   (b) judging an asymmetric state and an asymmetric polarity of the digital signal from a sum of the two side samples among the four samples if the zero-crossing point is detected; and
   (c) correcting an asymmetric error of the digital signal according to the detected asymmetric polarity.

14. The method as claimed in claim 13, wherein the step (a) detects the zero-crossing point by detecting an inversion state of signs of the two intermediate samples among the four samples.

15. The method as claimed in claim 14, wherein the step (b) comprises the steps of:
   (b1) judging the asymmetric state of the digital signal by obtaining the sum of the two side samples among the four samples if the zero-crossing point is detected; and
   (b2) judging the polarity of the digital signal according to the sign of the sum of the two side samples if the zero-crossing point is detected.

16. The method as claimed in claim 15, wherein the step (c) judges the asymmetric polarity of the digital signal to be negative if the sum of the two side samples is larger than 0, while it judges the asymmetric polarity of the digital signal to be positive if the sum of the two side samples is smaller than or equal to 0.

17. The method as claimed in claim 13, wherein the step (b) comprises the steps of:
   (b1) judging the asymmetric state of the digital signal by obtaining the sum of the two side samples among the four samples if the zero-crossing point is detected; and
   (b2) judging the polarity of the digital signal according to the sign of the sum of the two side samples if the zero-crossing point is detected.

18. The method as claimed in claim 17, wherein the step (c) judges the asymmetric polarity of the digital signal to be negative if the sum of the two side samples is larger than 0, while it judges the asymmetric polarity of the digital signal to be positive if the sum of the two side samples is smaller than or equal to 0.

* * * * *